No. 681,048. Patented Aug. 20, 1901.
G. V. ELLIS.
AUTOMATIC STARTING APPARATUS.
(Application filed Jan. 30, 1901.)
(No Model.)
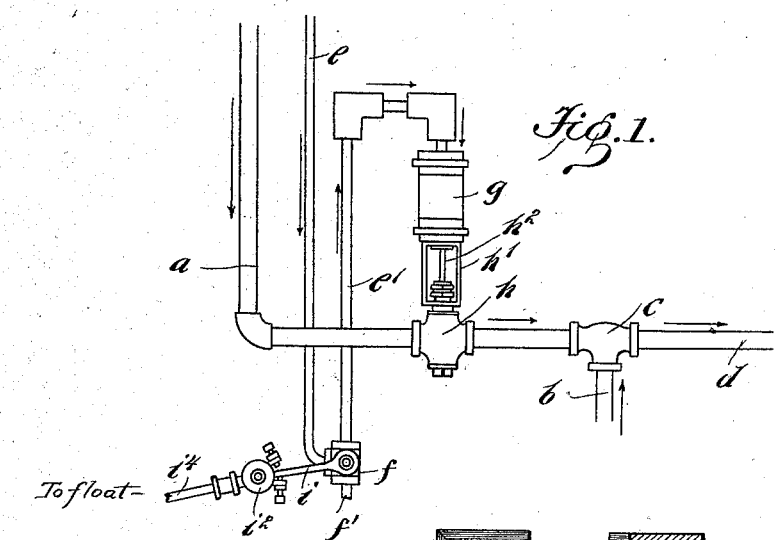
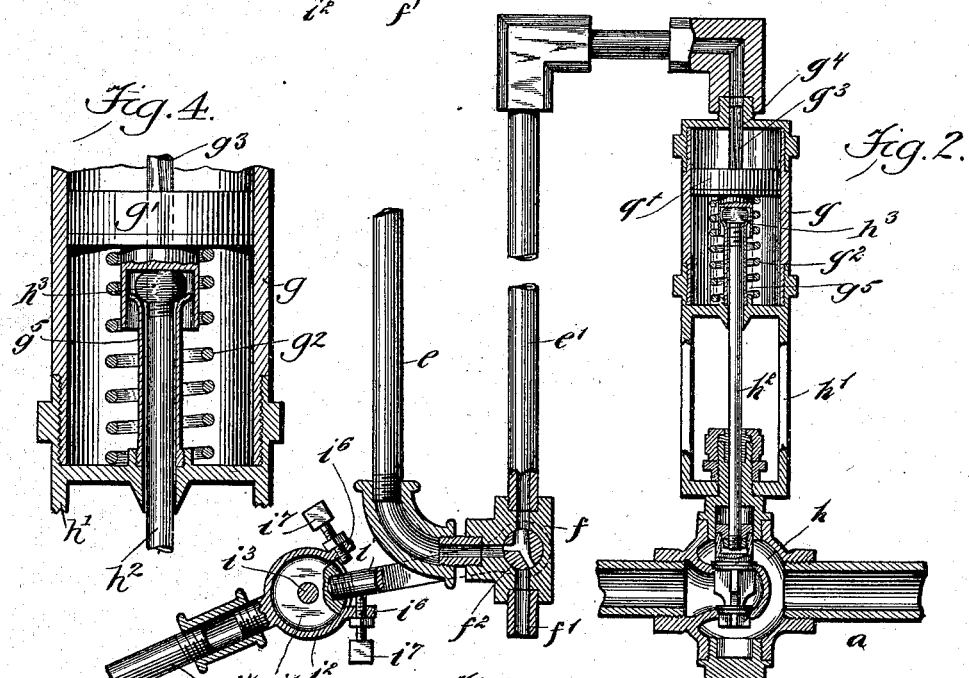
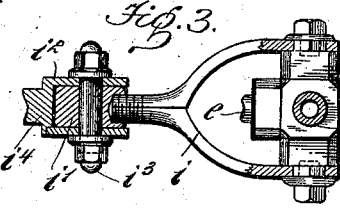
WITNESSES:
INVENTOR
George V. Ellis.
BY
ATTORNEYS

UNITED STATES PATENT OFFICE.

GEORGE V. ELLIS, OF NEW YORK, N. Y., ASSIGNOR TO TERESA F. KENNEY, OF SAME PLACE.

AUTOMATIC STARTING APPARATUS.

SPECIFICATION forming part of Letters Patent No. 681,048, dated August 20, 1901.

Application filed January 30, 1901. Serial No. 45,336. (No model.)

*To all whom it may concern:*

Be it known that I, GEORGE V. ELLIS, a citizen of the United States, and a resident of the city of New York, borough of Manhattan, in the county and State of New York, have invented a new and Improved Automatic Starting Apparatus, of which the following is a full, clear, and exact description.

The purpose of this invention is to provide a fluid-operated starting device for all classes of machinery. The form here shown is especially adapted to starting the ejector or other pump used to clear out cesspools and drainage-tanks in systems of sewerage. It is obvious also that the invention could be adapted to various other purposes which will make themselves apparent as this description progresses.

This specification is the disclosure of one form of the invention, while the claims define the actual scope thereof.

Reference is to be had to the accompanying drawings, forming a part of this specification, in which similar characters of reference indicate corresponding parts in all the views.

Figure 1 is a schematic view of my invention. Fig. 2 is an enlarged vertical section showing the construction of the various parts. Fig. 3 is a plan view, with parts in section, illustrating the device for throwing the three-way cock and also illustrating the lost movement involved in the operation thereof; and Fig. 4 is an enlarged section of a part of the apparatus to be hereinafter more fully described.

Referring to Fig. 1, let it be assumed that $a$ represents a pipe carrying fluid under pressure; $b$, a pipe leading from the drainage-tank which is to be pumped out; $c$, an ejector or other form of pump, and $d$ a discharge-pipe; also, let $e$ represent a smaller pipe having fluid under pressure which leads to a three-way cock $f$, this cock having a drain-nozzle $f'$ and communicating with a pipe $e'$, forming a branch of the pipe $e$ and leading to the cylinder $g$, which contains a piston and other devices for actuating a balanced or other valve $h$, which commands the pipe $a$. The three-way cock $f$ is normally so disposed that the pipes $e$ and $e'$ communicate and the pressure of the fluid therein is exerted within the cylinder $g$. The parts in this cylinder are arranged to hold the valve $h$ closed when such parts are under the action of the fluid from the pipes $e$ and $e'$. When the cock $f$ is thrown, it closes the communication between the pipes $e$ and $e'$ and places the drain $f'$ in communication with the branch pipe $e'$. This relieves the pressure within the cylinder $g$, and the valve $h$ by the action of a spring or its equivalent may then move to open position, permitting the fluid within the pipe $a$ to operate the ejector or pump $c$, and thus draw the liquid from the drainage-tank up through the pipe $b$ and out through the pipe $d$.

Referring to Fig. 2, the valve $h$ carries on its casing a frame $h'$, which sustains the cylinder $g$. To the valve is connected a stem $h^2$, which passes up into the cylinder and forms the rod of the piston $g'$, working in the cylinder. This piston is normally pressed upward, so as to open the valve $h$, by a spring $g^2$, situated in the cylinder, and projecting upwardly from the piston $g'$ is a rigid rod $g^3$, which works through the upper head of the cylinder and into a part of the pipe $e'$, so as to guide the movement of the piston. This rod $g^3$ is provided with one or more grooves $g^4$, which constitute by-passes and enable the free passage of the fluid into the cylinder $g$, notwithstanding that the rod $g^3$ enters the only orifice through which the fluid may reach the cylinder. Fig. 2 is supposed to show the parts under the action of the fluid-pressure from the pipe $e$, and in this view the piston $g'$ is moved down sufficiently to seat the valve $h$ and close the pipe $a$. When this pressure is relieved, the spring $g^2$ asserts itself, and the valve $h$ is thereby opened.

It will be apparent that since there is for a great part of the time a constant pressure of fluid above the piston $g'$ there will be a tendency to fluid leakage past the piston. To avoid a packing-box around the rod $h^2$ at the bottom of the cylinder, I provide a sleeve $g^5$, which is fastened to the lower end of the cylinder and projects upward in the cylinder around the rod $h^2$. The rod carries a knob $h^3$, which may be either fastened to or formed integral therewith and which when the piston and rod are in the position shown in Fig. 2 will bear on the upper end of the sleeve $g^5$, thus closing it and hermetically sealing the lower end of the cylinder.

The three-way cock $f$ comprises a casing in which is fitted a plug $f^2$, having three ports therein, as shown in Fig. 2, one port registering with the pipe $e$, another with the pipe $e'$, and the third with the drain-nozzle $f'$. When the cock is thrown, as shown in Fig. 2, the pipes $e$ and $e'$ are in communication with each other; but when the plug is turned so as to cut off the pipe $e$ communication is then formed between the plug $f^2$ and the pipe $e'$, and therefore when the plug is so turned the fluid-pressure from the pipe $e$ is not only cut off, but the pipe $e'$ is opened to the atmosphere, and through this pipe the upper end of the cylinder $g$ is opened to the atmosphere, thus relieving the pressure in the cylinder and permitting the spring $g^2$ to perform its office.

The three-way cock $f$ may be operated by any means desired. If this invention is used in connection with a drainage-tank and like appliances, it is preferable for obvious reasons to operate the cock by a float. I have here shown a construction adapted to that purpose. The plug $f^2$ of the cock $f$ has both of its ends connected with a yoke $i$, furnished with a disk-like head $i'$, rigidly connected thereto, the yoke $i$ spanning the casing of the cock $f$. A casing $i^2$ loosely embraces the disk $i'$ and is held pivotally thereon by a pin $i^3$, and this casing has attached thereto an arm $i^4$, which is adapted to be connected with the float-rod. (Not shown.) The casing $i^2$ is formed with two lips $i^6$ thereon, which are oppositely disposed and lie one above and the other below the stem of the yoke $i$. These lips carry set-screws $i^7$, which are arranged to engage with the yoke $i$, and thereby limit the movement of the casing $i^2$ on the disk $i'$. By adjusting these screws $i^7$ the loose movement of the casing $i^2$ on the disk $i'$ may be regulated to the required degree. Owing to the curvature of the arm $i^4$ and its attached parts the casing $i^2$ normally hangs in the position shown in Figs. 1 and 2—that is to say, it hangs downward, its free movement being arrested by the lower screw $i^7$ engaging on the under side of the yoke $i$. As the float begins to move upward its first movement is lost in the idle movement of the casing $i^2$ on the disk $i'$, and movement is not imparted to the yoke $i$ until the upper set-screw $i^7$ bears on the yoke, and then the parts $i'$ and $i^2$ will be rendered rigid, so that the further movement of the float will impart a movement to the yoke $i$, thus throwing the plug $f^2$ of the cock $f$. The purpose of this arrangement is to regulate the time when the apparatus is to be started to clear out a drainage-tank. Obviously it is not desirable to start the pumping operation the instant that liquid accumulates in the drainage-tank. It is desirable to allow the liquid to accumulate to a certain height before pumping it out, and this may be regulated to the required degree by adjusting the set-screws $i^7$, as explained.

Having thus described my invention, I claim as new and desire to secure by Letters Patent—

1. An automatic starting apparatus, comprising a pipe, a valve commanding the same, a cylinder, a piston working therein and having connection with the valve to actuate it, a device tending to move the valve into open position, and means for applying a fluid-pressure to the piston so as to move the valve against the tendency of said device, for the purpose specified.

2. An automatic starting apparatus, having a cylinder, a piston therein, a piston-rod connected with the piston and adapted to transmit the movement thereof to a valve, a device tending to push the piston in one direction, and means for applying fluid-pressure to the piston to hold it against the tendency of the said device.

3. An automatic starting apparatus, having a cylinder, a piston working therein, a piston-rod connected with the cylinder and adapted to transmit the movement thereof, a device tending to move the piston in one direction, means serving to apply fluid-pressure to the piston to move it against the tendency of the said device, and a three-way cock for commanding the said means and comprising a drain-orifice to open the cylinder to the atmosphere upon the cutting off of the fluid-supply.

4. An apparatus, comprising a pipe, a valve commanding the same, a cylinder, a piston working therein, a rod establishing communication between the valve and piston, a device tending to actuate the piston to hold the valve open, a pipe for conveying fluid under pressure to the cylinder to move the piston against the tendency of the said device and seat the valve, and a three-way cock commanding said pipe and having a drain-orifice for opening the cylinder to the atmosphere upon the closing of the pipe to the fluid-supply.

5. The combination of two pivotally-connected members adapted to transmit the movement of a float, and means for limiting the independent movement of one member on the other, for the purpose specified.

6. The combination of two members, one of which is provided with a disk at one end and the other section with a casing loosely inclosing the disk, a pivot joining the disk and casing, and means carried by the casing and adapted to limit the movement of the casing on the disk.

7. The combination of two members, one of which is provided with a disk and the other with a casing arranged loosely thereon, a pivot connecting the disk and casing, lips projecting out from the casing at opposite sides of the first-named member for limiting the movement of the casing on the disk.

8. The combination with a cylinder, and a piston and its rod, of a sleeve fastened to one end of the cylinder and projected into the cylinder around the rod, and a part moving in time with the piston and engaging the end of the sleeve to seal the same when the piston is at the end of its stroke.

9. In an automatic starting apparatus, a valve, a cylinder, a piston in the cylinder and operatively connected with the valve, means for controlling the admission of a fluid to the cylinder to cause the piston to hold the valve closed, and means for moving the piston in an opposite direction to that which it is moved by the fluid-pressure when the cylinder is relieved of fluid-pressure, as and for the purpose set forth.

10. In an automatic starting apparatus, a valve, a cylinder connected with a fluid-supply, a spring-pressed piston in the cylinder and operatively connected with the valve, and means for relieving the cylinder of fluid-pressure, as set forth.

11. In an automatic starting apparatus, a valve, a cylinder, a spring-pressed piston in the cylinder and having its stem connected with the valve, a supply-pipe for supplying a fluid to the cylinder, said pipe having a drain-outlet, and a three-way valve in said pipe, substantially as described.

In testimony whereof I have signed my name to this specification in the presence of two subscribing witnesses.

GEORGE V. ELLIS.

Witnesses:
   I. B. OWENS,
   JNO. M. RITTER.